US008959626B2

(12) United States Patent
Niemelä

(10) Patent No.: US 8,959,626 B2

(45) Date of Patent: Feb. 17, 2015

(54) DETECTING A SUSPICIOUS ENTITY IN A COMMUNICATION NETWORK

(75) Inventor: Jarno Niemelä, Espoo (FI)

(73) Assignee: F-Secure Corporation, Helsinki (FI)

( * ) Notice: Subject to any disclaimer, the term of this patent is extended or adjusted under 35 U.S.C. 154(b) by 36 days.

(21) Appl. No.: 12/928,532

(22) Filed: Dec. 14, 2010

(65) Prior Publication Data

US 2012/0151578 A1 Jun. 14, 2012

(51) Int. Cl.

| | |
|---|---|
| ***H04L 29/06*** | (2006.01) |
| ***H04L 12/58*** | (2006.01) |
| *H04W 4/14* | (2009.01) |
| *H04W 4/20* | (2009.01) |

(52) U.S. Cl.

CPC .............. *H04L 63/105* (2013.01); *H04L 51/12* (2013.01); *H04W 4/14* (2013.01); *H04W 4/206* (2013.01); *H04L 12/585* (2013.01); *H04L 63/1441* (2013.01)

USPC ................... 726/22; 726/23; 726/24; 726/25; 713/187; 713/188

(58) Field of Classification Search

CPC .................... H04L 29/06884; H04L 29/06823

USPC ............................... 726/22–25; 713/187–188

See application file for complete search history.

(56) References Cited

U.S. PATENT DOCUMENTS

| | | | | |
|---|---|---|---|---|
| 5,664,103 | A * | 9/1997 | Stein et al. | 709/205 |
| 7,225,466 | B2 * | 5/2007 | Judge | 726/22 |
| 8,387,141 | B1 * | 2/2013 | Zhukov et al. | 726/22 |
| 2005/0015626 | A1 | 1/2005 | Chasin | 713/201 |
| 2007/0130351 | A1 | 6/2007 | Alperovitch et al. | 709/229 |
| 2007/0226300 | A1 * | 9/2007 | Smith et al. | 709/206 |
| 2008/0082662 | A1 * | 4/2008 | Dandliker et al. | 709/225 |
| 2009/0182818 | A1 | 7/2009 | Krywanink | 709/206 |
| 2010/0318614 | A1 * | 12/2010 | Sager et al. | 709/206 |
| 2012/0278889 | A1 * | 11/2012 | El-Moussa | 726/23 |

OTHER PUBLICATIONS

Suman et al., NPL document, Abusing File Processing in Malware Detectors for fun and Profit, 2012, IEEE Symposium on Security and Privacy.*

* cited by examiner

*Primary Examiner* — Josnel Jeudy

(74) *Attorney, Agent, or Firm* — Harrington & Smith

(57) ABSTRACT

A method and apparatus for detecting a suspicious entity in a communication network. A receiving device receives a message from a sender. A processor obtains domain information or a user identity, and further contact information from data contained in the message. A reputation query message is sent to a Network Reputation Server (NRS), the reputation query message including the domain information or user identity. A reply is received from the NRS that indicates that the domain information or user identity is related to a suspicious entity. The receiving device then associates the contact information with the suspicious entity. In this way, if a user of the receiving device attempts to use the contact information, they can be prevented from doing this or informed that it relates to a suspicious entity.

14 Claims, 5 Drawing Sheets

S1. Receive message

S2. Obtain domain and other contact information

S3. Send reputation query

S4. Domain information supicious?

no yes

S5. Associate contact info with suspicious domain

S6. Send contact information to remote server

S7. Prevent device from using contact information

End

DETECTING A SUSPICIOUS ENTITY IN A COMMUNICATION NETWORK

TECHNICAL FIELD

The present invention relates to detecting a suspicious entity in a communication network.

BACKGROUND

Spam is an unsolicited message sent to a recipient. Email spam is well-known and used to advertise products and for other purposes. Spam can also be sent by other types of media, for example, instant messaging, Short Messaging Service (SMS) messages, mobile phone messaging and so on. It is difficult to catch a person or organization sending spam, as they can quickly move their operations. Efforts are therefore made to prevent spam from being received.

A common use of spam is in a so-called "phishing" attack. It is commonplace for financial institutions such as banks to offer financial services over the Internet to their customers. Criminals are keen to exploit the way that the banks provide these services by using the Internet to commit fraud. One of the most common methods employed by criminals is known as the "phishing" attack A phishing attack typically involves an "attacker" sending a spam email message claiming to be from a bank and requesting the recipient to submit sensitive account information for some purpose. Alternatively, the recipient may be asked to click on a link within the spam email message, where the link leads to a malicious website operated by the attacker that is designed to look like a legitimate bank website. The recipient is thus fooled into entering sensitive information One way to prevent spam from being delivered to an intended recipient is to analyse the "reputation" of the sender, and determine whether or not an email message from that sender is likely to be spam. FIG. 1 shows an example network architecture. A sender 1 of spam sends a spam email message towards a recipient 2. In reality, spam is typically sent to many recipients, but only one is shown in this example. The spam email message is routed via a server 3 in a network 4. The IP address of the sender is checked against a blacklist of IP addresses in a database 5. If the sender is known to send spam, and therefore provisioned in the database 5, then appropriate action is taken to prevent the spam email message from being sent on to the intended recipient 2.

A problem with this approach is that it will not succeed if the sender of the spam email message does not have IP address that corresponds to one provisioned in the database 5. A further problem is that this will not prevent spam messages sent using media other than emails, such as SMS messages. The message will therefore be sent to the receiver 2 who will not be warned that the message is probably spam.

A further problem is that if the message is not detected as spam, and the spam email message includes a telephone number or email address for the recipient to contact, the user will not be alerted to the fact that the telephone number or email address are associated with a suspicious message.

SUMMARY

It is an object of the invention to reduce the risk that a recipient of a suspicious message contacts an address associated with the sender of the suspicious message.

According to a first aspect, there is provided a method of detecting a suspicious entity in a communication network. A receiving device receives a message from a sender. A processor is used to obtain domain information or a user identity, and further contact information from data contained in the message. A reputation query message is sent to a Network Reputation Server (NRS), the reputation query message including the domain information or the user identity. A reply is received from the NRS that indicates that the domain information or user identity is related to a suspicious entity. The receiving device then associates the contact information with the suspicious entity. In this way, if a user of the receiving device attempts to use the contact information, they can be prevented from doing this or informed that it relates to a suspicious entity.

As an option, the domain information is obtained from any of a Uniform Resource Locator, information derived from a contact identity and an email address, and the contact information is selected from any of a telephone number, a further email address, information derived from a contact identity and a further Uniform Resource Locator.

As an option, the method further comprises one of preventing the user of the receiving device from contacting a remote device associated with the contact information, and quarantining the message received from the sender.

The method optionally further comprises sending the contact information to a remote server. In this case, the method may further comprise, at the remote server, associating the contact information with the suspicious entity. The remote server subsequently receives a communication from a sending device associated with the contact information, the communication destined for a further receiving device. The remote server can then take further action such as from blocking the communication, quarantining the communication and alerting the further receiving device that the communication has been sent using contact information associated with a suspicious entity.

The message from the sender is optionally selected from any of an email message and a Short Messaging Service message.

According to a second aspect, there is provided a receiving device for use in a telecommunications network. The receiving device is provided with a first receiver for receiving a message from a sender. A processor is provided, the processor being arranged to obtain domain information or a user identity, and further contact information from data contained in the message. A transmitter is used to send to an NRS a reputation query message, the reputation query message including the domain information or the user identity. A second receiver receives a reply message from the NRS, the reply message indicating that the domain information or user identity is related to a suspicious entity. The processor is arranged to associate the contact information with the suspicious entity.

The receiving device may be provided with a second transmitter for the sending the contact information to a remote server:

According to a third aspect, there is provided a server for use in a communication network. The server is provided with a receiver for receiving from a receiving device a message, the message including contact information associated with a suspicious entity, the entity having been determined to be suspicious as described above in the first aspect. A memory is provided for storing the contact information. A second receiver is provided for receiving a communication from a device associated with the contact information, the communication destined for a further receiving device. A processor is arranged to take further action selected from blocking the communication, quarantining the communication and alerting the further receiving device that the communication has been sent using contact information associated with a suspicious entity.

According to a fourth aspect, there is provided a method of preventing a device from sending an email message to a recipient in a communication network. A sending device operated by a user determines that the device is attempting to send an email. Using a processor, the sending device obtains a domain name associated with the email recipient. A reputation query message is sent to an NRS, the reputation query message including the domain name. A reply is received from the NRS, the reply message indicating that the domain information is related to a suspicious entity, which allows the sending device to take further action on the basis of the reply message.

As an option, the further action comprises one of preventing the email message from being sent and, prior to sending the email message, alerting the user to the fact that the email recipient is suspicious.

There are several ways to determine that the device is about to attempt to send an email. For example, a sending function in an email client may be hooked.

According to a fifth aspect, there is provided a sending device for use in a telecommunication network. The sending device is provided with a processor arranged to determine that the device is attempting to send an email. The processor is further arranged to obtain a domain name associated with the email recipient. A transmitter is provided for sending a reputation query message to a NRS, the reputation query message including the domain name, and a receiver is provided for receiving from the NRS a reply message, the reply message indicating that the domain information is related to a suspicious entity. The processor is further arranged to take further action on the basis of the reply message.

As an option, the further action comprises any of preventing the email message from being sent and, prior to sending the email message, alerting the user to the fact that the email recipient is suspicious.

The processor is optionally arranged to determine that the device is attempting to send an email by hooking a sending function in an email client.

According to a sixth aspect, there is provided a computer program, comprising computer readable code which, when run on a computer device, causes the computer device to perform the method as described above in the first aspect According to a seventh aspect, there is provided a computer program, comprising computer readable code which, when run on a computer device, causes the computer device to perform the method as described above in the fourth aspect.

According to an eighth aspect, there is provided a computer program product comprising a computer readable medium and a computer program as described above in the sixth aspect, wherein the computer program is stored on the computer readable medium.

According to a ninth aspect, there is provided a computer program product comprising a computer readable medium and a computer program as described above in the eighth aspect, wherein the computer program is stored on the computer readable medium.

DETAILED DESCRIPTION

A first embodiment of the invention allows a recipient of suspicious email or spam that contains contact information such as an email or a telephone number to call to be alerted to the fact that the contact information is also suspicious. The following description uses a suspicious SMS message as an example, but it will be appreciated that it could equally apply to other forms of messages such as emails and instant messaging.

Figure 1:
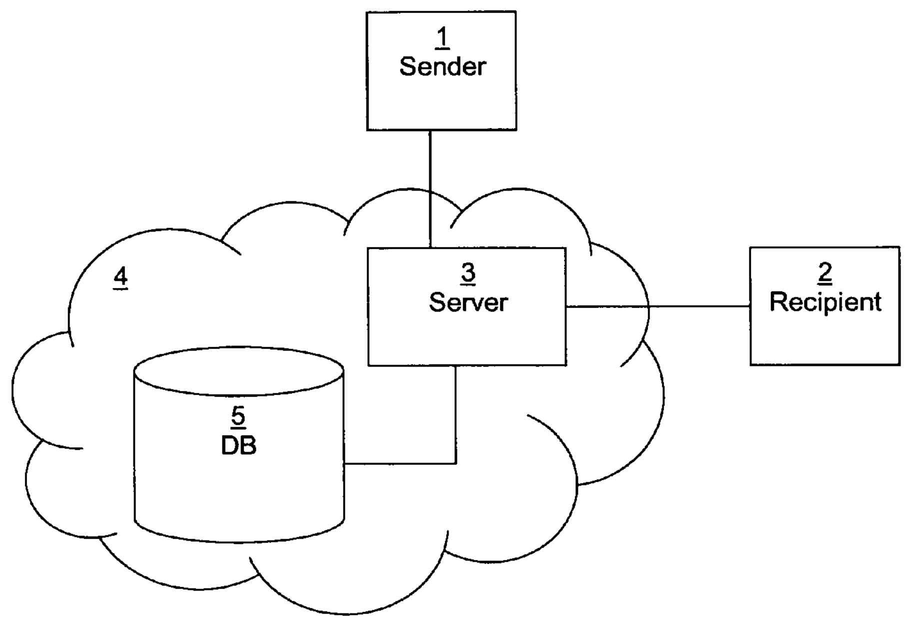
FIG. 1 illustrates schematically in a block diagram a known network architecture for detecting spam messages.
Figure 2:
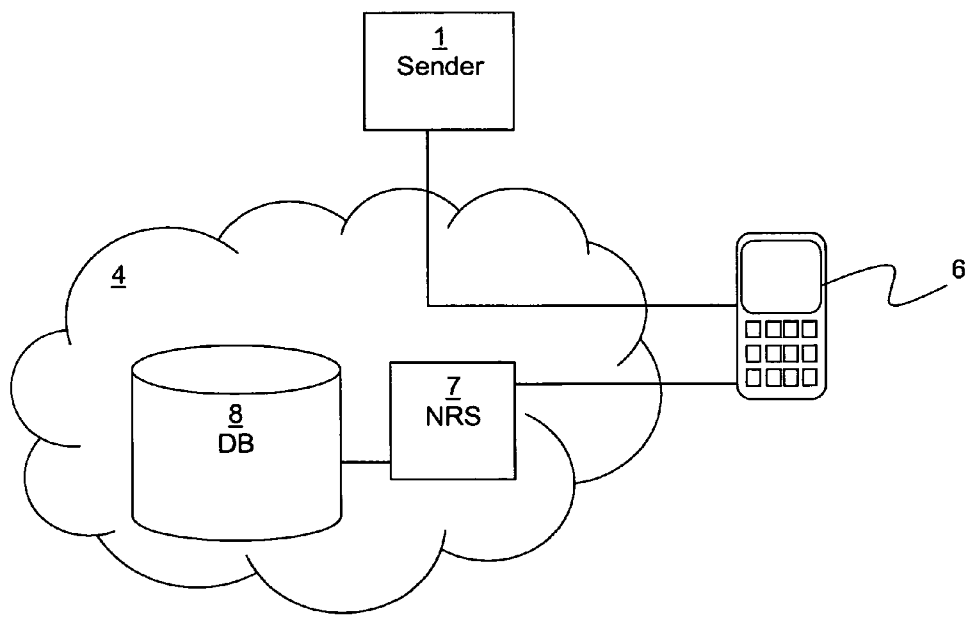
FIG. 2 illustrates schematically in a block diagram a network architecture according to an embodiment of the invention.

FIG. 2 illustrates a network architecture according to the first embodiment. There is illustrated a sender 1 of a suspicious email, a receiving device 6, a server 7 for determining a reputation of the sender, termed herein a Network Reputation Server (NRS) and a database 8 of suspicious addresses that the NRS consults in order to determine the reputation of the sender 1.

Spam and other suspicious messages frequently contain web links or email addresses, and may also contain other contact information such as a telephone number. When the receiving device 6 receives an SMS message, it parses the incoming message for domain information obtained from sources such as Uniform Resource Locators (URLs), email addresses, domain names, messenger identities used by Skype, MSN and so on. The domain information is sent to the NRS 7 which compares the domain with suspicious domains in the database 8. If the domain is deemed to be suspicious, this information is sent to the receiving device 6, which associates the suspicious domain with the other contact information in the suspicious message. The receiving device 6 assumes that the other contact information has the same reputation as the domain information, and can take appropriate further action. This may be, for example, blocking any calls to a telephone number associated with the suspicious domain, or at least asking the user if he wishes to proceed with a telephone call to the telephone number associated with the suspicious domain. Similarly, email messages to an email address associated with the suspicious domain can be blocked, or the user can be asked to confirm that they want to send the message.

Once the further contact information is associated with the suspicious domain, it may be sent to a server operated by a provider of online security services, who can then use the further contact information to inform other nodes that the further contact information is associated with a suspicious domain. This allows the other nodes to take appropriate action such as blocking communications to the further contact information or asking a user to confirm that they wish to proceed.

Figure 3:
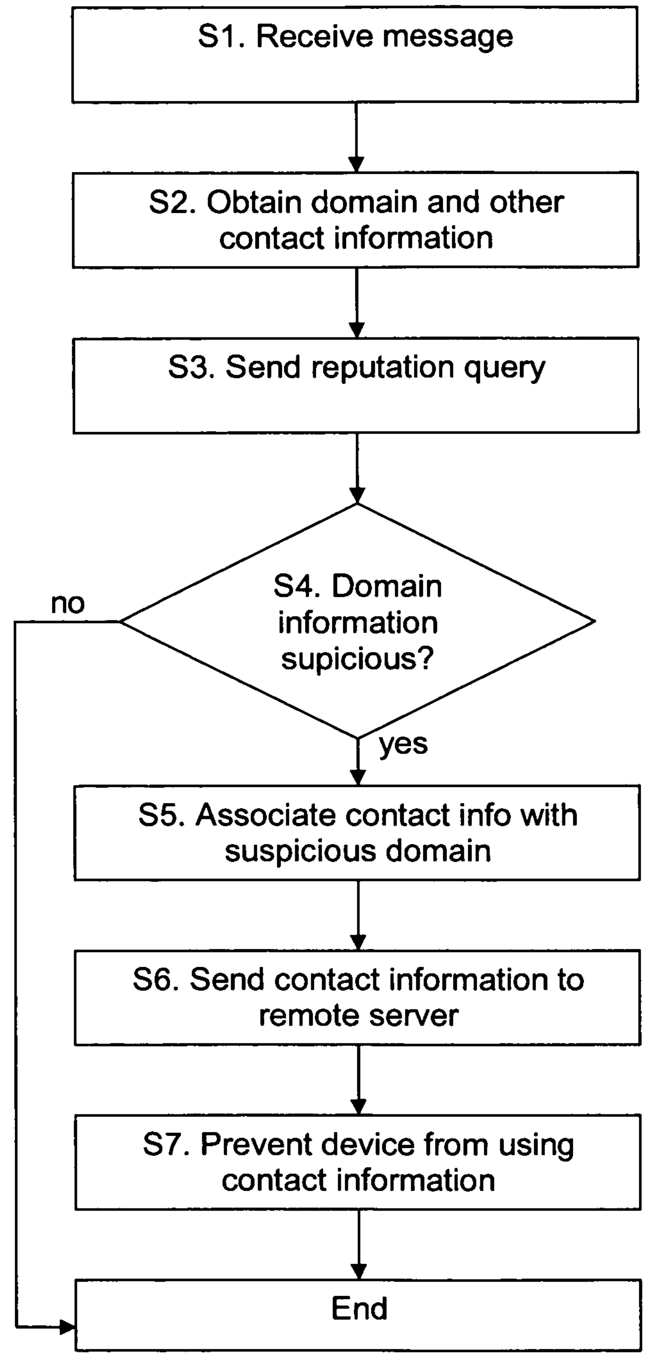
FIG. 3 is a flow diagram illustrating the steps according to an embodiment of the invention.

FIG. 3 illustrates the steps according to the first embodiment, with the following numbering corresponding to the numbering of FIG. 3:

S1. The receiving device 6 receives a message. In this example, the message is an SMS spam message that contains the text "Congratulations! Your cell number has won £2 million pounds in the Mobile UK Promo. Claim code: UKMBL/10. To claim your prize, please call +44 123 456789. More information can be found at www.mobilelottouk.xxx".

S2. The receiving device 6 obtains domain information from the message. In this case, a URL is provided in the message and the receiving device obtains the domain www.mobilelottouk.xxx.

S3. The receiving device 6 Mobile client sends a reputation query message to the NRS about the domain www.mobilelottouk.xx.xx S4. The NRS 7 responds that domain is suspicious. If the domain is not suspicious the NRS 7 responds that the domain is not suspicious or does not respond at all.

S5. If the domain is suspicious, the receiving device 6, associates any other contact information in the SMS message (including the number in the text and the number from which the SMS was sent, if available) with the suspicious domain.

S6. In an optional embodiment, and if privacy law allow it, the receiving device 6 sends the contact information to a server operated by a security services operator.

S7. If the user of the receiving device 6 subsequently attempts to contact the telephone number, the receiving device blocks the call and optionally displays a warning to the user or asks the user if he is sure that he wishes to proceed with the call.

In an optional embodiment, instead of step S7, the receiving device 6 may simply quarantine the SMS message to that it is not displayed to the user.

Figure 4:
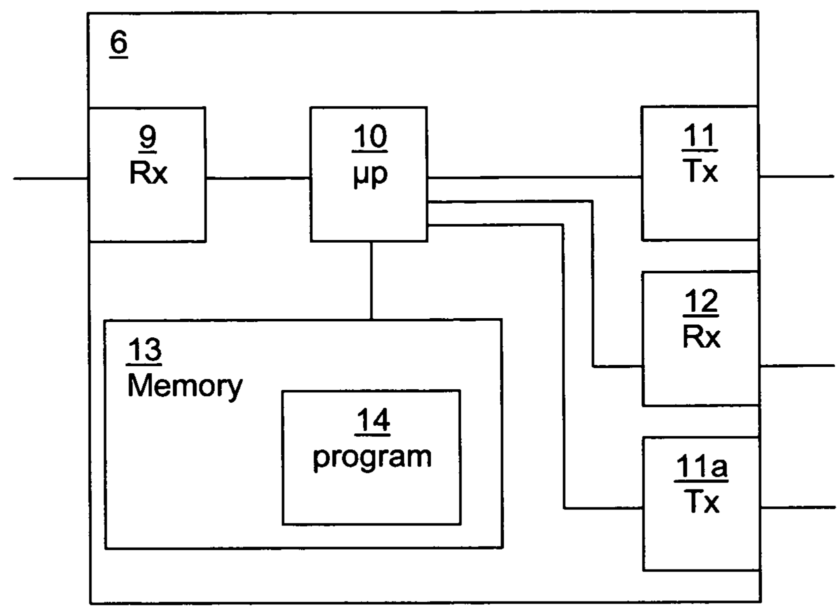
FIG. 4 illustrates schematically in a block diagram a receiving device according to an embodiment of the invention.

Referring to FIG. 4 herein, there is illustrated a receiving device 6 as described above. The receiving device 6 is provided with a first receiver 9 for receiving the message from the sender 1. A processor 10 obtains domain information and further contact information such as a telephone number from data contained in the message, as described above. A transmitter 11 is used to a reputation query message to the NRS 7, the reputation query message including the domain information. A second receiver 12 is arranged to receive a reply message from the NRS 7, the reply message indicating that the domain information is related to a suspicious entity. The processor then associates the contact information with the suspicious entity. A second transmitter 11*a*, which may be embodied as the same physical transmitter as the first transmitter 11, is arranged to send the contact information to a remote server operated by a security services operator.

A computer readable medium in the form of a memory 13 may also be provided. This can be used to store information relating to the suspicious message, including the association between the domain and the contact information. The memory 13 may also be used to store a computer program 14 which, when executed by the processor 10, causes the receiving device 6 to behave as described above.

Figure 5:
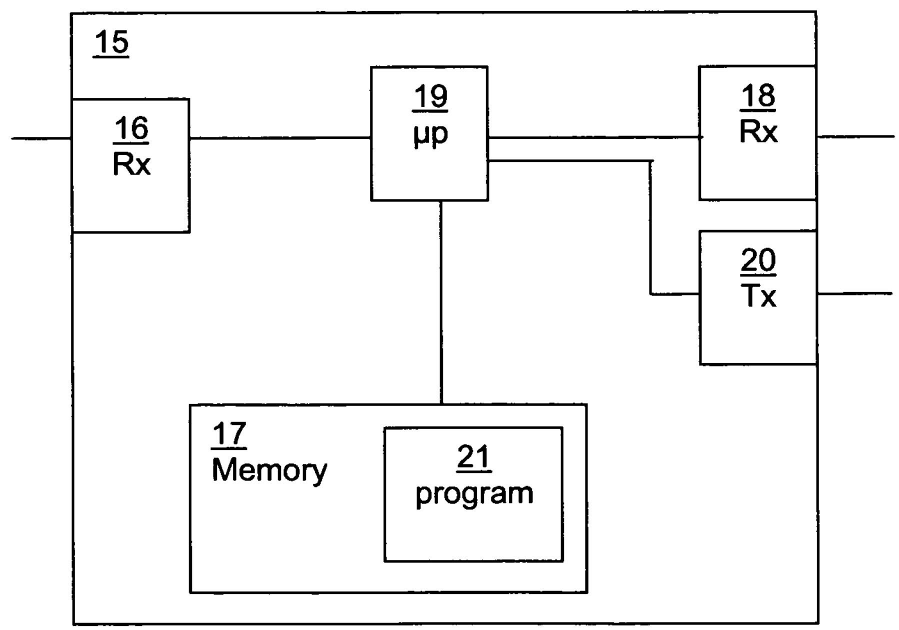
FIG. 5 illustrates schematically in a block diagram a server according to an embodiment of the invention.

Turning now to FIG. 5, there is illustrated a server 15 according to an embodiment of the invention. The server 15 is provided with a first receiver 16 for receiving contact information from the receiving device 6 that the receiving device has determined is associated with a suspicious entity. A computer readable medium in the form of a memory 17 is provided for storing the contact information. A second receiver 18 subsequently receives a communication destined to a further receiving device. A processor 19 determines that the communication is associated with contact information a associated with a suspicious entity, and takes further action. Further action may include blocking or quarantining the communication, or using a transmitter 20 to send a message to the further receiving device informing the further receiving device that a communication has been sent to the further receiving device from a suspicious entity.

The memory 17 may also be used to store a computer program 21 which, when executed by the processor 19, causes the server 15 to behave as described above.

While the above description discloses parsing the received message to obtain a domain name, the method also works by parsing the message to obtain a user identity. The term "user identity" is used herein to refer to an identity used to identify a user, such as a Skype® identity or a Microsoft® Live identity. In this case the user identity is sent to the NRS 7 in a reputation query message, and the NRS performs a reputation check based on the user identity rather than a domain name.

Figure 6:
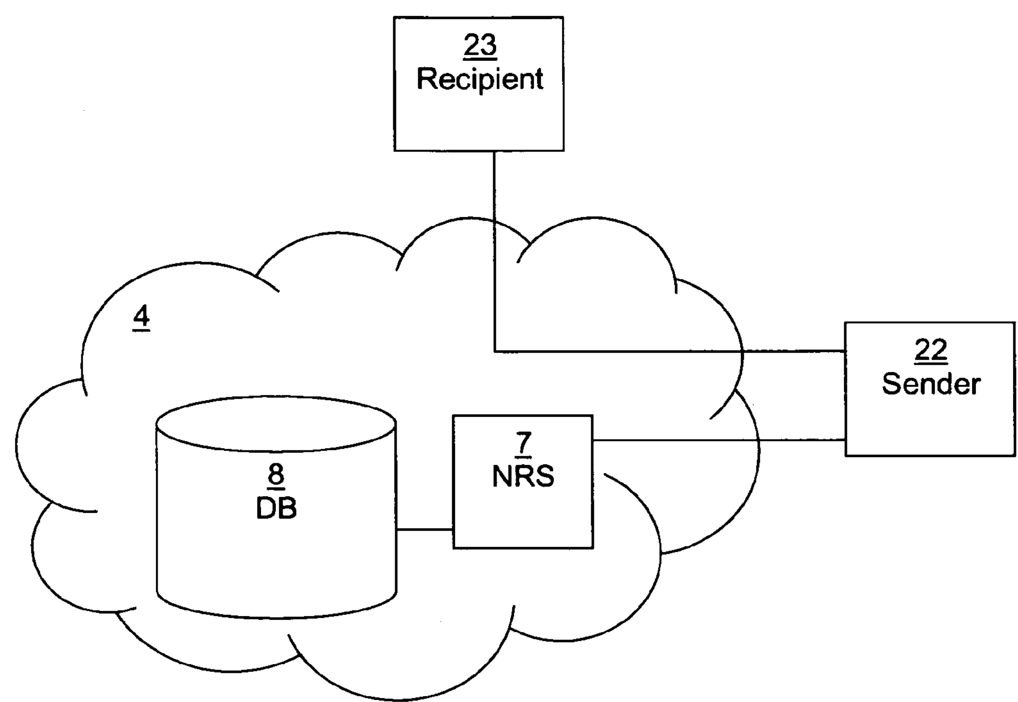
FIG. 6 illustrates schematically in a block diagram a network architecture according to a further embodiment of the invention.

According to a second specific embodiment of the invention, the suspicious domain is used to prevent a user from sending an email message to an email address associated with the suspicious domain. FIG. 6 is a network diagram in which a sender 22 wishes to send an email to a recipient 23. The email address that the sender 22 has obtained for the recipient 23 may have been obtained from a spam message or a malicious website.

The NRS 7 can query a database 8 that contains information about the reputation of a domain and domains can be categorized as, for example, malicious, suspicious, phishing and other categories that users is recommended to avoid. If a domain hosts a phishing page, then there are very few reasons that an innocent user would wish to send an email message to that domain. When a user attempts to send an email message, the sender 22 queries the NRS 7 using the domain of the recipient's email. If the NRS 7 responds that the domain is suspicious, the sending device 22 can take action such as blocking the sending of the email or seeking confirmation that the user really wants to send an email message to that address.

Mail blocking can be done both for client email applications such as Outlook and Thunderbird, and also for web browser based email services. There are several ways to detect that a user is attempting to send an email message. For example, activation of the "send" button in a web browser can be hooked and the domain of the recipient 16 can be checked before allowing the form request in the web browser to be sent from to the web mail server.

Figure 7:
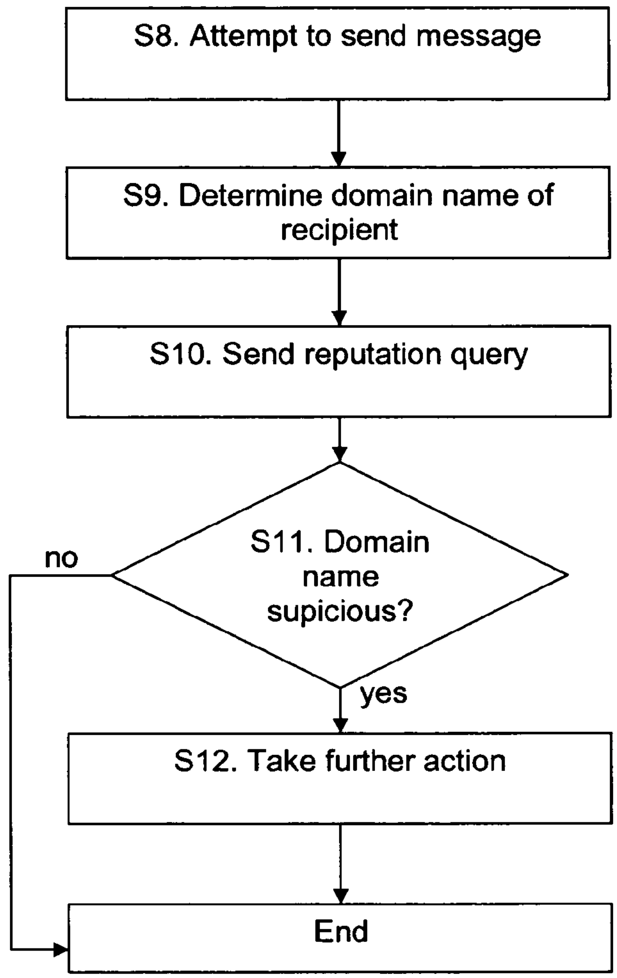
FIG. 7 is a flow diagram illustrating the steps according to a further embodiment of the invention.

FIG. 7 shows the steps according to the second specific embodiment. The following numbering corresponds to the numbering of FIG. 6:

S8. A user has received a SMS message with the following text: "Congratulations! Your cell number has won £2 million pounds in the Mobile UK Promo. Claim code: UKMBL/10. To claim, send an email to: claims@mobilelottouk.xxx". The user attempts to send an email to claims@mobilelottouk.xxx.

S9. The attempt to send the email is detected and a determination is made of the domain of the email address. IN this case, the domain is mobilelottouk.xxx.

S10. A reputation query message is sent to the NRS 7 for the reputation of domain mobilelotto.xxx.

S11. The NRS 7 responds to the reputation query message, and a determination is made as to whether the domain is suspicious.

S12. If the domain is suspicious, the sending device 15 takes further action such as blocking the sending of the message or asking the user of the sending device 15 if they are sure they wish to send the message.

Figure 8:
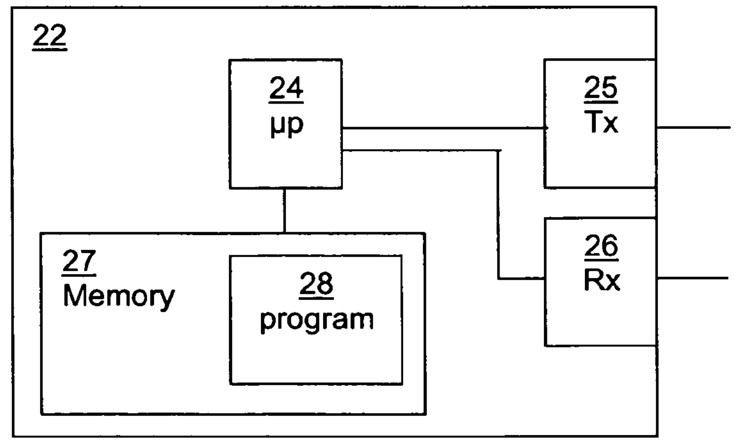
FIG. 8 illustrates schematically in a block diagram a sending device according to a further embodiment of the invention.

Turning now to FIG. 8, there is illustrated a sending device 22. The sending device 22 is provided with a processor 24 that is arranged to determine that the sending device 22 is attempting to send an email message. The processor 24 is arranged to obtain a domain name associated with the email recipient. A transmitter 25 is provided for sending a reputation query message to a NRS 7, the reputation message including the domain name. A receiver 26 is provided for receiving a reply message from the NRS 7. The reply message indicates in this example that the domain information is related to a suspicious entity. The processor 24 is arranged to take further action on the basis of the reply message, such as blocking the email message from being sent or, prior to sending the email message, alerting the user to the fact that the email recipient is suspicious.

One way that the processor 24 may determine that the device 15 is attempting to send an email is by hooking a sending function in an email client.

The sending device 22 may also be provided with a computer readable medium in the form of a memory 27. The memory 27 may also be used to store a computer program 28 which, when executed by the processor 24, causes the receiving device 22 to behave as described above.

Note that the second specific embodiment is compatible with the first embodiment.

The skilled person will appreciate that various modifications may be made to the above described embodiments without departing from the scope of the present invention. For example, it will be appreciated that parsing of messages to obtain contact information, domain information and/or user identities may be applied to any type of message, such as emails, SMS messages, instant messages and so on.

The following abbreviations have been used in this specification:

SMS Short Messaging Service
NRS Network Reputation Server
URL Uniform Resource Locator

The invention claimed is:

1. A method of detecting a suspicious entity in a communication network, the method comprising:

at a receiving device, receiving a message from a sender;

using a processor, obtaining one of domain information or a user identity, and further contact information from data contained in a body of the message;

sending to a Network Reputation Server a reputation query message, the reputation query message including one of the domain information or the user identity;

receiving from the Network Reputation Server a reply message, the reply message indicating that the domain information is related to the suspicious entity;

associating the further contact information with the suspicious entity;

sending the further contact information to a remote server, wherein at the remote server:

associating the further contact information with the suspicious entity;

receiving a communication from a device using the further contact information, the communication destined for a further receiving device;

taking further action selected from blocking the communication, quarantining the communication and alerting the further receiving device that the communication has been sent using contact information associated with the suspicious entity.

2. The method according to claim 1, wherein the domain information is obtained from any of a Uniform Resource Locator, information derived from a contact identity and an email address, and the further contact information is selected from any of a telephone number, a further email address, information derived from a further contact identity and a further Uniform Resource Locator.

3. The method according to claim 1, further comprising one of preventing a user of the receiving device from contacting a remote device associated with the further contact information, and quarantining the message received from the sender.

4. The method according to claim 1 wherein the message from the sender is selected from any of an email message and a Short Messaging Service message.

5. A receiving device for use in a telecommunications network, the receiving device comprising:

a first receiver for receiving a message from a sender;

a processor arranged to obtain one of domain information or a user identity and further contact information from data contained in a body of the message;

a transmitter for sending to a Network Reputation Server a reputation query message, the reputation query message including one of the domain information or the user identity;

a second receiver for receiving from the Network Reputation Server a reply message, the reply message indicating that one of the domain information and the user identity is related to a suspicious entity;

the processor being further arranged to associate the further contact information with the suspicious entity; and further comprising, a second transmitter for sending the further contact information to a remote server, wherein at the remote server the further contact information is associated with the suspicious entity such that when a communication from a device using the further contact information is received, where the communication is destined for a further receiving device, further action is taken by the remote server, the further action being selected from blocking the communication, quarantining the communication and alerting the further receiving device that the communication has been sent using contact information associated with the suspicious entity.

6. A server for use in a communication network, the server comprising:

a receiver for receiving from a receiving device a message, the message including further contact information associated with a suspicious entity, the entity having been determined to be suspicious using the method of claim 1;

a memory for storing the further contact information;

a second receiver for receiving a communication from a device associated with the further contact information, the communication destined for a further receiving device;

a processor arranged to take further action selected from blocking the communication, quarantining the communication and alerting the further receiving device that the communication has been sent using contact information associated with the suspicious entity.

7. A computer program product comprising a non-transitory computer readable medium and a computer program including computer readable code stored on the non-transitory computer readable medium, arranged to cause a computer to perform:

at a receiving device, receiving a message from a sender;

using a processor, obtaining one of domain information or a user identity, and further contact information from data contained in a body of the message;

sending to a Network Reputation Server a reputation query message, the reputation query message including one of the domain information or the user identity;

receiving from the Network Reputation Server a reply message, the reply message indicating that the domain information is related to a suspicious entity;

associating the further contact information with the suspicious entity;

sending the further contact information to a remote server, wherein at the remote server the further contact information is associated with the suspicious entity such that when a communication from a device using the further contact information is received, where the communication is destined for a further receiving device, further action is taken by the remote server, the further action being selected from blocking the communication, quarantining the communication and alerting the further receiving device that the communication has been sent using contact information associated with the suspicious entity.

8. The method according to claim 1, further comprising:

at the receiving device, determining that the receiving device is attempting to send an email;

using the processor, obtaining a domain name associated with a recipient of the email;

sending a further reputation query message to the Network Reputation Server, the further reputation query message including the domain name;

receiving from the Network Reputation Server a further reply message, the further reply message indicating that the domain information is related to the suspicious entity; and taking further action on the basis of the further reply message.

9. The method according to claim 8, wherein the further action comprises one of preventing the email message from being sent and, prior to sending the email message, alerting a user that the email recipient is suspicious.

10. The method according to claim 8, wherein determining that the receiving device is attempting to send an email comprises hooking a sending function in an email client.

11. A receiving device according to claim 5, wherein the processor is arranged to determine that the device is attempting to send an email, wherein the processor is further arranged to obtain a domain name associated with an email recipient, wherein the reputation query message includes the domain name, wherein the reply message indicates that the domain information is related to the suspicious entity, and wherein the processor is arranged to take further action on the basis of the reply message.

12. The receiving device according to claim 11, wherein the processor is arranged to take further action comprising one of preventing the email from being sent and, prior to sending the email, alerting a user to the fact that the email recipient is suspicious.

13. The receiving device according to claim 11, wherein the processor is arranged to determine that the device is attempting to send an email by hooking a sending function in an email client.

14. The method according to claim 1, wherein obtaining further contact information from data contained in the body of the message relates to another entity that is not associated with the sender of the message.

* * * * *